United States Patent
Lazar

(10) Patent No.: US 7,296,529 B2
(45) Date of Patent: Nov. 20, 2007

(54) FLUIDYNAMIC LIFT COMBINED ARRAY, TECHNOLOGY

(75) Inventor: Bereli M. Lazar, 1590 Broadway St. Apt 410s, San Francisco, CA (US) 94109

(73) Assignee: Bereli M. Lazar, San Francisco ( * ) Notice: Subject to any disclaimer, the term of this patent is extended or adjusted under 35 U.S.C. 154(b) by 0 days.

(21) Appl. No.: 11/455,139

(22) Filed: Jun. 19, 2006

(65) Prior Publication Data

US 2007/0227433 A1    Oct. 4, 2007

Related U.S. Application Data

(60) Provisional application No. 60/714,895, filed on Sep. 8, 2005.

(51) Int. Cl.
*B63B 1/00*    (2006.01)
(52) U.S. Cl. ..................... 114/271; 244/218
(58) Field of Classification Search ............... 114/271, 114/272, 273; 244/218, 219
See application file for complete search history.

(56) References Cited

U.S. PATENT DOCUMENTS 4,824,053 A * 4/1989 Sarh .................... 244/218
4,926,778 A * 5/1990 Johnston ................ 114/273
6,834,835 B1 * 12/2004 Knowles et al. ........... 244/218

* cited by examiner

Primary Examiner—Lars A. Olson

(57) ABSTRACT

A Fluidynamic Lift Combined Array, Technology for flying, and/or land, and/or other motor vehicles comprises:
  a. an aerodynamic structure of chord-telescopic smooth-united multisegment lifting wings; and/or
  b. a set of hydrodynamic circuits including closed loop waved tunnels each with placed inside pump impelling operative liquid and having curved elbows with lifting winglets; and
  c. a method of generating high lift forces in combined fluidynamic, self-boosting, accumulative, and energy integrating and conservative technology.

This proposal can provide:
  Short, safe, convenient for people, and appropriate for planes takeoffs and landings at speeds about 20 miles per hour.
  Sure overcoming any difficulties connected with heavy load for land and other vehicles.
  High general efficiency and profound reliability in upkeeping and thrifty technology with substantial energy conservation by additional lift generated in any tense situations.

11 Claims, 3 Drawing Sheets

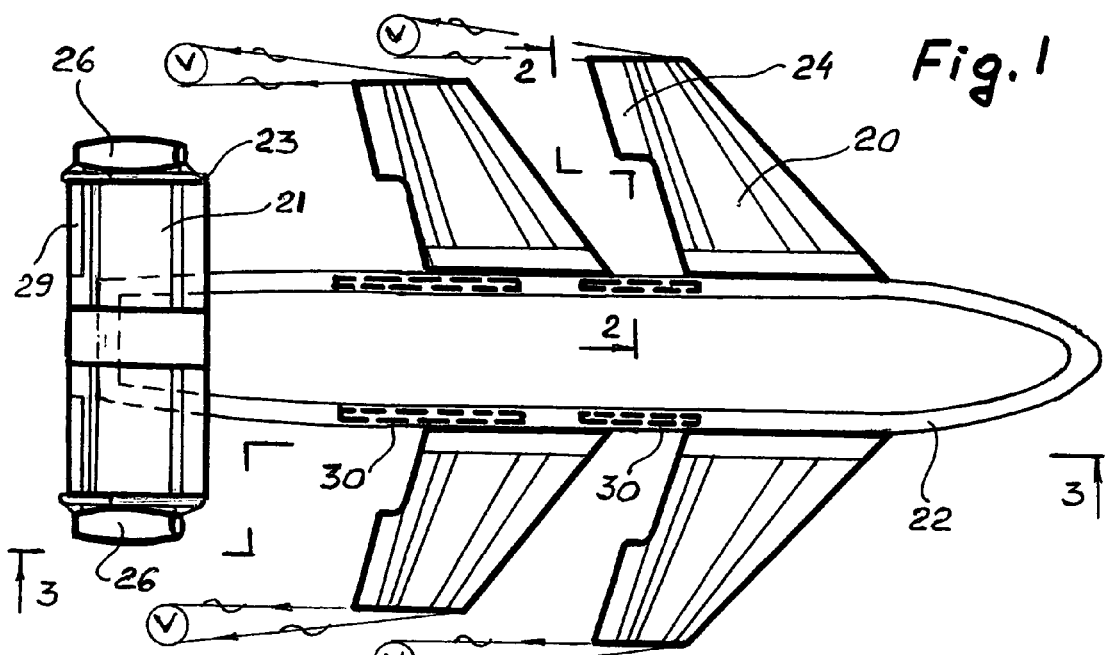
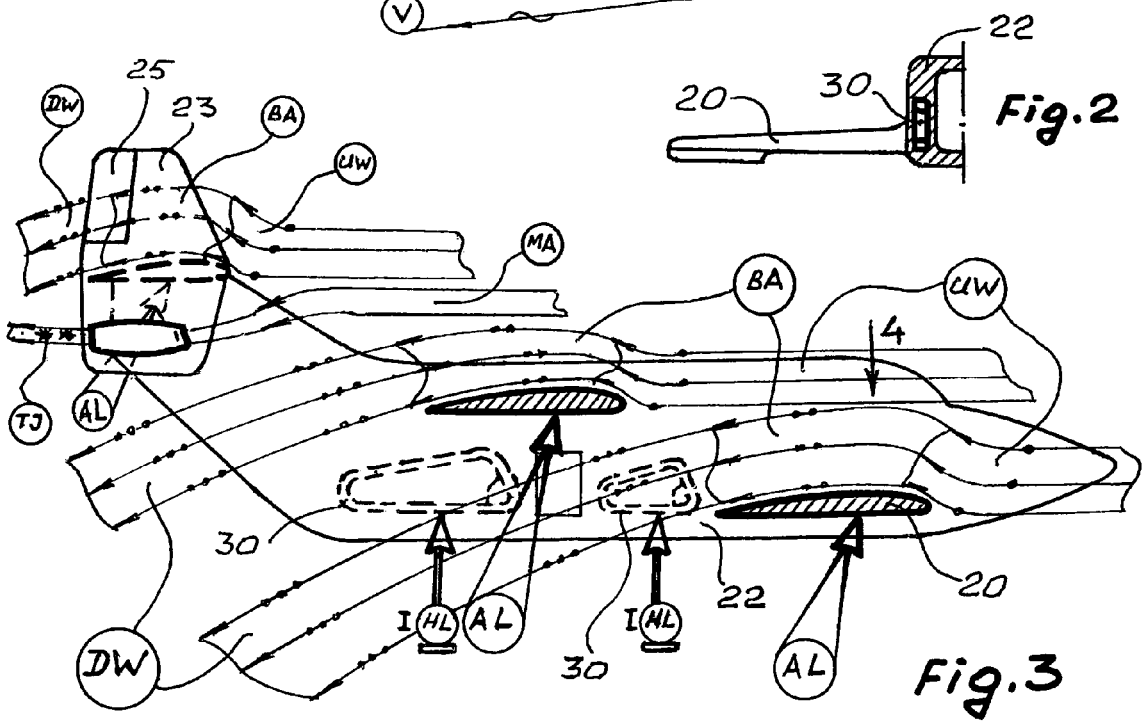

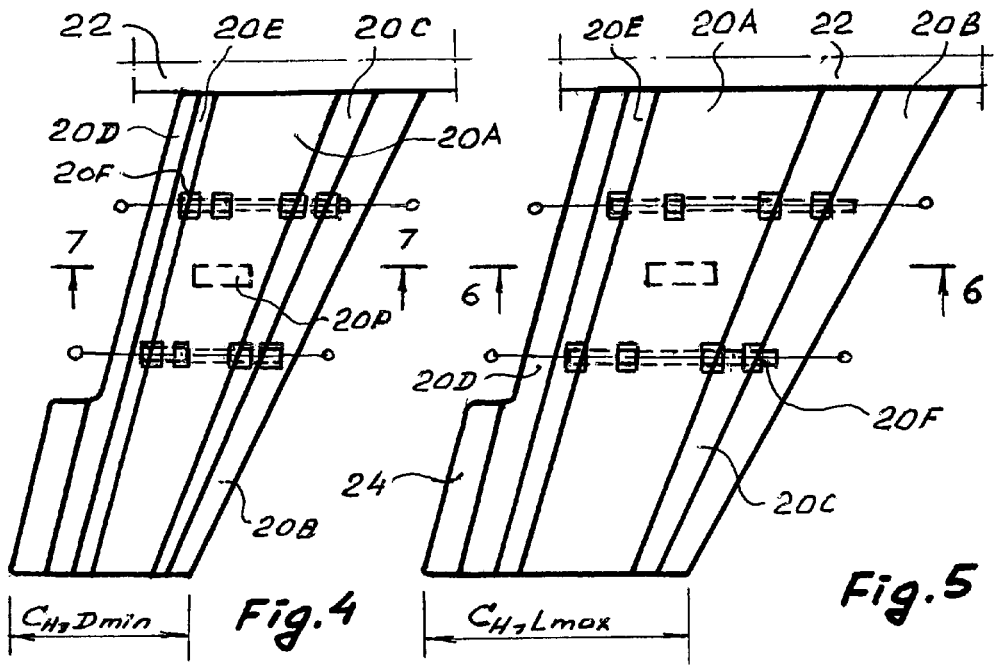
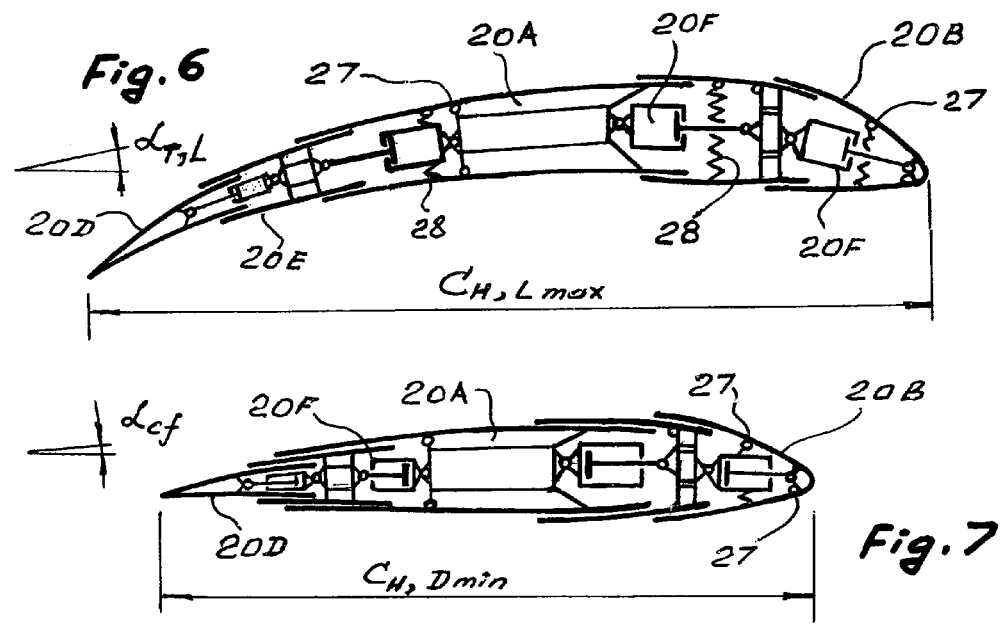

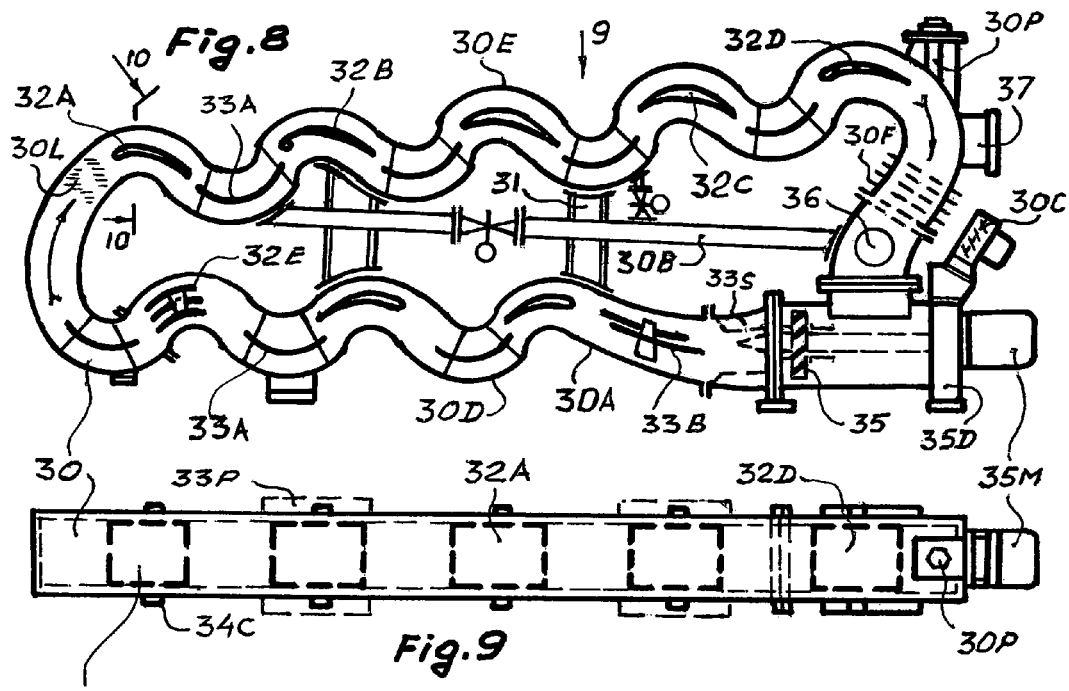

FLUIDYNAMIC LIFT COMBINED ARRAY, TECHNOLOGY

CROSS-REFERENCE TO RELATED APPLICATIONS

This application claims the benefit of PPA No. 60/714,895 filed Sep. 8, 2005 by present inventor.

FEDERALLY SPONSORED RESEARCH

Not applicable.

SEQUENCE LISTING OR PROGRAM

Not applicable.

BACKGROUND OF THE INVENTION

This proposal relates to the aerodynamic wing-lifting structures and closed hydrodynamic circuits with lifting winglets. This proposal deals with chord-telescopic wing-design for open systems of flying vehicles, and closed self-boosting circuits for any kind of motor vehicles. The subject matter is a combined upkeeping technology consisting of aerodynamic and hydrodynamic systems with wing-lifting structures for overcoming various tense situations.

Some specific problems involved in conventional motor vehicles:

a) Various regular airfoils of flying vehicles contain so-called high-lift devices with multiple flaps, slats, slots, other separate elements. Said mechanical interrupters cause interactions among air circulations, wing-upwashes, wing-downwashes, and, in many cases, motor's incoming airflows and high-speed powerful exhaust-jets. Said interactions lead to various deformations and disturbings of wing-airflows and force high and unsafe speeds for takeoffs and landings needed to compensate said energy losses of airflows around lifting wings.

b) Any vehicles need substantial reducing of their sum-general loads, especially in hard portions of operations such as takeoffs and landings for flying means and various road-difficulties for land and other vehicles.

c) No motor vehicles use the remarkable high energy ratio which well known closed fluidynamic testing tunnels demonstrate.

The real knowledge of the Fluidynamic lift nature is not complete even now. For example, two high-experienced specialists D. Anderson and S. Eberhardt, in their book "Understanding Flight" [629.13An2336u; 2001] describe some important miscomprehended problems.

In other words, the theory of Fluidynamic lift is not perfect. That is why aircrafts can fly but mostly cannot take off and land at appropriate speeds about 20 miles per hour with comfort for people and high reliability for the planes, all their systems and interconnections in multiple high-dynamic operations.

My proposal solves some of said above problems and presents a combined technology and means for any kind of motor vehicles to be more effective. The actual combined reducing of sum-general loads is substantial, about 50%. It is done by additional lift forces generated in energy preservation and accumulating technology. This technology provides to all parts of all the flows around wings in aerodynamic structures and around winglets in self-boosting hydrodynamic circuits appropriate zones free from any disturbings and energy losses.

Any prior arts connected with developed in present proposal chord-telescopic curve-tilting smooth-united multi-segment lifting aerodynamic wings and their combined and/or independent usage with also developed in present proposal closed loop waved hydrodynamic winglet-circuits providing integrated lift forces were not found.

BRIEF SUMMARY OF THE INVENTION

It is the object of this proposal to provide:

a. Various, combined and cooperative fluidynamic lift forces for motor vehicles and statics means in order to facilitate their total-sum loading.

b. High vehicles' efficiency in developed upkeeping thrifty aerodynamic and self-boosting accumulative hydrodynamic technologies with substantial energy savings.

c. Easy, safe and sure overcoming tense situations, connected with heavy load, for any motor vehicles.

d. Short, safe, sure take-offs and landings at speeds about 20 miles per hour, more convenient for people, and appropriate for aircraft's' systems and their connections keeping and preserving their reliability.

The nature and substance of Fluidynamic Lift combined Array, Technology are two fluidynamically similar but independent and combined lifting systems:

built-in hydrodynamic sets for any of motor vehicles and/or static means including aircrafts, trucks, cars, ships, trains, helicopters, elevators, heavy containers, others;

outer aerodynamic structures for various flying vehicles like planes, and others.

Proposed self-boosting accumulative technology of closed loop waved circuit-tunnels with hydrodynamic lifting winglets and curved elbows, and upkeeping thrifty technology with chord-telescopic curve-tilting wings in aerodynamic structures, provide separate and/or combined fluidynamic lift forces for a high effective common load-reducing result.

DRAWING FIGURES

In the drawings closely related elements have the same numbers but different alphabetic suffixes, numbers of views, and sections according to numbers of figures where they are shown.

FIG. 1 shows a plan view of a exemplary flying aircraft designed by "Fluidynamic Lift Combined Array, Technology" with:

an aerodynamic structure of multi-segment chord-telescopic wings, and a set of four built-in hydrodynamic closed-loop circuits.

FIG. 2 is a schematic, turned horizontal, part-section 2-2 taken in FIG. 1.

FIG. 3 illustrates a side view-section 3-3 taken in FIG. 1, and shows the general design and aerodynamic interactions; simplified contours of hydrodynamic circuits and resulting lifting forces are also shown.

FIG. 4 shows a plan view 4 from FIG. 3 and illustrates one of said wings in drawn-in state for high cruise speed with minimum drag.

FIG. 5 shows the same plan view of the same wing of FIG. 4 but in extended state for low speed takeoff or landing with maximum lift.

FIGS. 6 and 7 show the schematic cross-sections 6-6 and 7-7 taken in FIGS. 5 and 4, respectively, illustrating chord-telescopic interactions with curve-tilting displacements of movable smooth-united segments of said wings relatively its static carcass-frame. The coaxial sets of force cylinders, hinges, springs, section chords, angles of attack are also shown.

FIG. 8 shows the side view-schematic section of the waved hydrodynamic circuit and illustrating its general design lifting winglets, hydrolic pump, closed loop tunnel, cavitation control, bypass, air cooler-set.

FIG. 9 shows the plan view 9 taken in FIG. 8.

FIG. 10 illustrates a cross section 10-10 taken in FIG. 8 and shows a preferable design of the closed loop tunnel.

FIG. 11 shows a schematic side view of an exemplary bus with five built-in hydrodynamic closed loop circuits and their integrated lift forces.

FIG. 12 is a cross section 12-12 in FIG. 11.

FIG. 13 is a fragment 13 of FIG. 11, it shows a partial side section of lifting winglet in upper zone of said circuit's tunnel and general hydrodynamic interactions around said winglet including hydrodynamic and centrifugal lift forces.

REFERENCE NUMERALS AND SYMBOLS IN DRAWINGS

20—Chord-telescopic curve-tilting wing [CTW]
20A—CTW carcass-frame
20B—CTW head-segment
20C—CTW middle for-segment
20D—CTW tail-segment
20E—CTW middle aft-segment
20F—Force cylinder
20P—Cylinders' power set
21—CTW—horizontal stabilizer
22—Fuselage
23—Vertical stabilizer
24—Aileron.
25—Rudder
26—Thrust Motor
27—Hinge
28—Spring
29—Elevator
30—Hydrodynamic circuit
30A—Closed-loop waved tunnel
30B—Controlled bypass
30C—Air cooler
30D—Bottom bend.
30E—Comb elbow
30F—Cooling fins
30L—Operative liquid
30P—Static pressure piston-valve
31—Tunnel frame structure
32A,B,C,D,E—Hydrodynamic lifting winglets
33A,B—Guide-grids
33P—Pocket
33S—Flow straightener
34C—Wiglet control
34G—Guide-grid control
35—Axial-flow propeller pump
35D—Pump drive
35M—Pump motor
36—Visualization
37—Meters, control
38—Bus engine Reference numerals 20F, 20P, 22, 23, 24, 25, 26, 27, 28, 30B, 30C, 30F, 31, 35D, 35M, 36, 37, 38 are conventional units, elements, and structures used in present new combined Fluidynamic lift-technology. Control of regular elements is not shown.

Aerodynamic Symbols:

—Wing upwash
—Wing bending airflow
—Tip vortex
—Wing downwash-jet
$C_{H,\ Lmax}$—Extended wing section chord of the wing 20
$C_{H,\ Dmin}$—Drawn-in wing section chord of the wing 20
$\measuredangle_{T,\ L}$—Angle of attack for takeoff and landing.
$\measuredangle_{c,\ f}$—Angle of attack for cruise flight
O———O—Force cylinders' set common axis
—Aerodynamic lift force Hydrodynamic and Other Symbols:

—Winglet upwash
—Winglet bending flow
—Winglet downwash-jet
—Circuit operative liquid flow
—Motor incoming airflow
—Motor thrust jet
—Winglet hydrodynamic lift force
—Operative liquid resulting centrifugal lift force
—Circuit integrated lift force

DETAILED DESCRIPTION OF THE INVENTION

The Fluidynamic Lift Combined Array, Technology for motor vehicles includes two systems:

an aerodynamic structure of chord-telescopic multisegment smooth-united lifting wings 20, 21 for flying vehicles, and a set of hydrodynamic circuits 30 comprising closed loop waved tunnels 30A with lifting winglets 32 and operative liquid 30L inside said tunnels, for any kind of vehicles and some static means.

Both said systems can work together cooperating each with other in common motor vehicle or separately and independently.

FIGS. 1,2,3 illustrate how said systems can be designed and arranged into an exemplary aircraft. There are shown:

an arrangement of lifting wings 20, 21 with fuselage 22, thrust motors 26 in order to provide for all acting aerodynamic flows needed clear zones without any interactions and interdisturbings;

built in placement of circuits 30 connected with vertical walls of fuselage 22;

outer aerodynamic lift forces AL, created by wings 20, 21, inner integrated hydrodynamic lift forces HL generated in circuits 30;

clear cooperations of general flows with said aerodynamic structure;

vertical stabilizers 23, ailerons 24, rudders 25, elevators 29 are also shown.

FIGS. 1,3 show the general acting flows with circled symbols UW, BA, DW, V, MA, TJ. The clear nondisturbing cooperative interactions among the all said flows at all their directions and zones are illustrated:

The wings 20, 21, and aircraft thrust motors 26 are arranged in the aerodynamic structure in vertically declined order, so Any upper adjacent wing is placed back in airflows direction, and Any lower adjacent wing is placed forward in flight direction.

Therefore, Interaffections and mutual disturbings of airflows bending wings, upwashes, downwashes, vortices and thrust-motor-flows near the flying vehicle are prevented.

FIGS. 4,5,6, and 7 illustrate the general design and chord-telescopic smooth-united operations of said lifting wings 20, 21 with displacements of their segments 20B, 20C, 20D, 20E around static carcass-frames 20A. Said chord-telescopic displacements, are provided by coaxial sets of force cylinders 20F driven by power sets 20P.

The hinges 27 and springs 28 provide needed mini-turns, support and self-adjusting to the segments of the wings 20, 21 for needed aerodynamic positions. This gives the maximum lift when the chord of the wing section is extended to $C_{H,Lmax}$ and the angle of attack is $\alpha_{T,L}$ providing short, slow, and safe takeoffs and landings at small speeds about 20 miles per hour.

The same said means give needed minimum drag when the chord of the wing section is shorter by drawn-in telescopic segments 20B, C,D,E the chord becomes equal $C_{H, Dmin}$ and angle of attack is $\alpha_{cf}$ providing minimum drag for high speed cruise flights.

The force cylinders 24 are installed and act by their coaxial sets and have their power sets 20P. The said cylinders can work separately, independently or together, providing needed displacement and self-adjusting of moving segments, correct aerodynamic performances without affecting and disturbing of airflows, upwashes, downwashes, circulations and vortices thus preserving all the energy of air jets for effective aerodynamic lift forces.

FIGS. 8,9,10 show the hydrodynamic circuit 30 comprising said tunnel 30A, hydrolic controlled bypass 30B, air cooler 30c with cooling fins 30F, visualization 36, meters, control 37. A preferably axial-flow propeller pump 35 impels operative liquid 30L inside said tunnel 30A by motor 35M and drive 35D.

Said liquid 30L is a preferably high-density solution like heavy antifreeze, salt water, bromide, other.

Said tunnel 30A also includes:

Upper and lower waved closed loop contoured rows of smooth-connected tubular upper curved elbows 30E and lower smooth bends 30D, A kit of lifting winglets 32A,B,C,D,E, placed in said elbows 30E in series, A kit of guide-grids 33A, B and flow-straighteners 33S placed in said bottom bends 30D, A static pressure control valve device 30P with a springed piston to adjust and limit possible cavitation of operative liquid 30L, Winglet controls 34C, guide-grids controls 34G.

Some tunnels 30A can include adjustable pockets 33P for some kinds of waved elbows 30E winglets 32 and operative liquids in order to provide additional fluid-flow equalization.

Said elbows 30E have cross section areas and curves' radii smaller than adjacent bends have in order to provide bigger velocity of operating liquid 30L in elbow-portions of the tunnel 30A. Said winglets 32 can be various and different including monowinglets, ladder-like, compound with smooth high-lift devices, and/or others in the same tunnel 30A depending on design.

FIGS. 11, 12, 13 illustrate an exemplary set-arrangement of several hydrodynamic circuits 30 into vertical walls of an exemplary bus.

FIG. 11 shows also the circuit integrated lift-forces IHL reducing the common bus-load including its own weight with engine 38.

FIG. 13 illustrates in fragmentary section view of the tunnel's elbow 30E, winglet 32D, operative liquid 30L circulating around winglet, visualization 36, cooling fins 30F. The hydrodynamic lift force HL generated by winglet 32D, and result centrifugal lift force CF generated by operative liquid 30L running in curved elbow 30E are shown.

OPERATION, EFFECTIVENESS, SOME CONCLUSIONS

Aerodynamic Structure a) The force cylinders 20F (or solenoids, or others), driven by their power sets 20P, move the smooth-united segments 20B, C, D, E relatively carcass 20a, and provide for said chord-telescopic curve-tilting wings 20, 21 mini-gap shifts and almost gap-less displacements. These shifts lead to maximum lift AL in extended drawn-off state for short takeoffs and landings at speeds about 20 miles per hour and minimum drag at drawn-in state for high-speed cruise flights.

b) Any possible interactions and interdisturbings among any various flows, jets vortices are effectively minimized. Slow takeoffs and landings, reducing of the general load by all the generated lift forces provide calm conditions to any aircraft system and real high reliability and security.

c) The preservation the energy of downwash-jets and thus the self-protecting and conservation of generated lift forces in diverse flight circumstances provide economic effect, energy savings, stable flights.

Set of Hydrodynamic Circuits 30 d) The preferably, axial-flow propeller pump 35 operates as self-booster impelling the operative liquid 30L in closed loop tunnel 30A, working at itself, for itself, for lifting winglets 32, and for curved elbows 30E. The high power ratio of the pump motor 35M is cyclically provided and effective energy preservation is reached. This is the method of my accumulative technology in which the singular pump 35 works actually in series with itself, providing high potential circulative hydrodynamic flow in closed loop tunnel 30A with multiplied pressure ratio and limited suppressed cavitation.

e) The operative liquid 30L interacts with lifting winglets 32 and elbows 30E in the closed loop tunnel 30A providing integrated lift forces consisting of hydrodynamic portions generated by winglets 32, and centrifugal portions generated by operative liquid 30L in upper zones of elbows 30E due to curve radii, high velocity, and high density of liquid 30L.

FIGS. 8, 10, 13 demonstrate how the phenomenon of an integrated lift force appears in said closed loop tunnel 30A:

The well known hydrodynamic lift HL is mostly provided by preservation of energy of the flow which is circulating and bending the winglets 32 forcing powerful downwash-jets in waved elbows 30E. The winglets 32 push themselves off from these jets reacting to jets which winglets 32 produced, thus generating hydrodynamic lift forces inside closed loop tunnel 30E, The centrifugal forces CF provided by liquid 30L moving inside curved upper zones of elbows 30E, The integrated upwarded lift force I HL is the sum of hydrodynamic lift HL and resulting centrifugal forces CF accounting some downward centrifugal losses in smooth, low-velocity, big radii bends 30D.

The guide-grids 33A, B and flow-straighteners 33S provide damping to vortices, flow equalization and correct flow directions to the adjacent winglets 32. The initial static pressure of the operative liquid 30L is regulated by piston 30P in order to minimize any cavitation; the controllers 34C and 34G adjusting winglets 32 and guide-grids 33G, pump drive 35D regulating capacity of the pump 35 and thus the effective velocity of operative liquid 30L; controlled regulating of bypass 30B; air cooler 30C provide needed conditions to the high potential internal flow in said self-boosting hydrodynamic technology.

A couple of basic formulae and notes.

a) Fluidynamic lift force of any aerodynamic wing 20, 21, and/or winglet 32:

$$L_w = C_L \cdot \frac{1}{2} p \cdot u^2 \cdot Sw,$$

where $C_L$—lift coefficient, p—fluid density,
U velocity of the fluid,
Sw—working area of the wing.

b) Centrifugal forces of the operative liquid 30L in upper winglet—elbows and lower guide-grid bends:

$$CF = \frac{\dot{M} \cdot U_L^2}{G \cdot R} \gamma,$$

where
$\dot{M}$—instant mass of running liquid 30L in the curved zone,
$U_L$—velocity of the liquid 30L in the curved zones,
$\gamma$—damping coefficient,
G—gravity acceleration, R—curve radius.

c) Sum—result centrifugal force
$\overline{CF} = \Sigma \overline{CF}_E - \Sigma \overline{CF}_B$, where
$\Sigma \overline{CF}_E$—vector sum of elbow's centrifugal forces,
$\Sigma \overline{CF}_B$—vector sum of bend's centrifugal forces, d) Integrated circuit lift force is a vector sum:
I $\overline{HL} = \overline{HL} + \overline{CF}$, where
$\overline{HL}$ is a sum of hydrodynamic winglet—lift forces e) Hydrodynamic circuit 30' power ratio PRc:

$$PR_c = \frac{Qp \cdot Pa}{H.P.P.},$$

where
Qp—capacity of axial flow pump 35,
Pa—accumulated pressure of liquid 30L in stable regime H.P.P.—power of pump motor 35M.
$PR_C$ is about 7.5 depending on design.

What is claimed is:

1. A Fluidynamic Lift Combined Array for motor vehicles comprising:
    a) an aerodynamic structure of multi-segment smooth-united chord-telescopic lifting wings, and
    b) a set of hydrodynamic circuits each concluding a closed loop tunnel with a hydrolic pump which propels an operative liquid filling the tunnel for integrated lift forces generation.

2. The Array of claim 1 wherein said wings comprise extending and drawn-in curve-tilting segments with hinges and springs to provide self-adjusting in telescopic shiftings for needed areas, section cambers and angles of attack.

3. The Array of claim 1 wherein said wings comprise sets of coaxial force cylinders for telescopic shifting said wing-segments.

4. The cylinders of claim 3 can shift their segments independently or together with other segments each driven by matching cylinder by design.

5. The cylinders of claim 3 can be hydrolic or solenoid.

6. The Array of claim 1 wherein any of said tunnels includes:
    upper and lower waved closed loop rows of smooth connected tubular comb-curved elbows and bottom bends,
    a kit of lifting winglets placed inside any of said elbows in series, and any elbow has its winglet,
    a kit of guide-grids and straighteners placed inside any of said bends in order to be adjacent to nearest two winglets, and provide damping vortices,
    turbulence limitation, operative fluid-flow equalization and correct fluid-flow direction,
    a static pressure control valve device with a springed piston to limit possible cavitation of said operative liquid.

7. The tunnel of claim 6 wherein said winglets and guide-grids have controls for adjusting.

8. The tunnel of claim 6 wherein said elbows have cross-sectional areas and curves' radii smaller than adjacent bends have in order to provide bigger velocity of the operative liquid near winglets than near guides-grids thus getting:
    a) bigger hydrodynamic lift and bigger upward centrifugal forces of inner fluid-flow in said elbows,
    b) effective smooth damping of vortices,
    c) smaller downward centrifugal forces of said fluid-flow in said bends.

9. The Array of claim 1 wherein said pump is a preferably axial-flow propeller pump with adjustable impellers or drives for capacity controlling.

10. The Array of claim 1 wherein said tunnels can include adjustable pockets for some kinds of waved elbows and operative liquids in order to provide additional fluid-flow equalization.

11. The Array of claim 1 wherein said hydrodynamic circuits include controlled hydrolic bypasses, coolers, cooling fins, flow-meters to optimize selfboosting flow-pressure-accumulative work of said pumps ,thus providing integrated lifting forces in said closed loop tunnels.

* * * * *